(12) United States Patent
Bhaskaran et al.

(10) Patent No.: US 10,742,832 B2
(45) Date of Patent: Aug. 11, 2020

(54) PROVIDING PRINTED CONFIDENTIAL DOCUMENTS

(71) Applicant: Hewlett-Packard Development Company, L.P., Houston, TX (US)

(72) Inventors: Shinoj Bhaskaran, Bangalore (IN); Pooja, Bangalore (IN)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/761,947

(22) PCT Filed: Jan. 22, 2016

(86) PCT No.: PCT/IN2016/050025
§ 371 (c)(1),
(2) Date: Mar. 21, 2018

(87) PCT Pub. No.: WO2017/125940
PCT Pub. Date: Jul. 27, 2017

(65) Prior Publication Data
US 2018/0278780 A1 Sep. 27, 2018

(51) Int. Cl.
*H04N 1/00* (2006.01)
*G06F 3/12* (2006.01)
(Continued)

(52) U.S. Cl.
CPC ....... *H04N 1/00862* (2013.01); *G06F 3/1222* (2013.01); *G06F 3/1238* (2013.01); *G06F 3/1259* (2013.01); *G06F 3/1285* (2013.01); *G06F 21/608* (2013.01); *G06F 21/88* (2013.01); *H04N 1/00633* (2013.01)

(58) Field of Classification Search
USPC .................................. 358/1.1–3.29
See application file for complete search history.

(56) References Cited

U.S. PATENT DOCUMENTS 5,752,697 A    5/1998   Mandel et al.
7,389,985 B2   6/2008   Schaefer et al.
(Continued)

FOREIGN PATENT DOCUMENTS

CN    101872402 A    10/2010
CN    102019276 A    4/2011
CN    103544440 A    1/2014

OTHER PUBLICATIONS

NTWare. Secure Printing Control the Output of Sensitive Documents. Oct. 4, 2011. http://www.adventusasia.com/ ~ 2 pages.

*Primary Examiner* — Marcellus J Augustin
(74) *Attorney, Agent, or Firm* — HP Inc. Patent Department (57) ABSTRACT

Examples of providing printed confidential documents are described herein. In an example, a printing system includes at least two protected trays to store printed confidential documents. The at least two protected trays may be coupled to each other to enable transfer of the printed confidential documents between the at least two protected trays. Further, an output tray may be coupled to at least one of the at least two protected trays to provide the printed confidential documents for collection. Furthermore, on receiving an authentication input, the printed confidential documents may be transferred from one of the at least two protected trays to the output tray.

17 Claims, 7 Drawing Sheets

(51) Int. Cl.
  *G06F 21/88* (2013.01)
  *G06F 21/60* (2013.01)

(56) References Cited

U.S. PATENT DOCUMENTS

| | | | |
|---|---|---|---|
| 2006/0220308 A1* | 10/2006 | Schaefer | B65H 39/10 271/298 |
| 2006/0274355 A1 | 12/2006 | Ferlitsch et al. | |
| 2007/0070394 A1* | 3/2007 | Ida | G03G 15/6552 358/1.15 |
| 2007/0075168 A1* | 4/2007 | Rodriguez | B02C 18/0007 241/36 |
| 2008/0193182 A1 | 8/2008 | Sasama | |
| 2008/0204815 A1* | 8/2008 | Kazama | H04N 1/00355 358/401 |
| 2008/0259386 A1* | 10/2008 | Fujino | G06F 3/1288 358/1.15 |
| 2009/0066987 A1* | 3/2009 | Inokuchi | G03G 15/36 358/1.13 |
| 2009/0328159 A1 | 12/2009 | Luo | |

\* cited by examiner

PROVIDING PRINTED CONFIDENTIAL DOCUMENTS

BACKGROUND

Generally, use of a shared network environment is encouraged for better utilization of available computing and other associated resources. In a shared network environment, a shared network device may be accessed by multiple users connected to a shared network. One such example of a shared network device is a printing device. Users may connect to and use the shared printing device for printing documents for cost reduction and efficient utilization of available printing resources.

BRIEF DESCRIPTION OF FIGURES

The following detailed description references the drawings, wherein.

DETAILED DESCRIPTION

Confidential documents, i.e., documents, which are to be made accessible to authorized user(s), may be printed using a shared printing device for better utilization of printing resources. To protect confidentiality of the printed document, a user generally enters a password in the printing device to initiate printing of documents. As the printing is initiated after entry of the password, the user may have to wait near the printing device until the printing of documents is completed to ensure that no one else collects the printed documents. When a large document is to be printed, the user may have to wait for a long time, resulting in inefficient utilization of time and user dissatisfaction.

Alternatively, a secure tray may be used to store printed confidential documents until they are retrieved by the user upon authentication at the printing device. However, the secure tray can be used by one user at any given time to ensure confidentiality of the printed documents. Of course, even if the number of secure trays is increased, the concurrent users or print jobs may be limited to the number of available secure trays in the printing device, thereby restricting the usage of the printing device, where a number of users are using the same printing device.

Examples of the present subject matter describe a printing system for printing confidential documents. The printing system includes, for instance, an output tray and at least two protected trays coupled to each other to enable transfer of the printed confidential documents between the at least two protected trays. A protected tray may be a lockable internal tray of the printing system to store printed confidential documents for multiple print jobs. Accordingly, the printed confidential documents may be securely kept in the protected tray to prevent unauthorized users from accessing the printed confidential documents. Further, the output tray may be coupled to at least one protected tray to provide the printed confidential documents for collection.

In an example implementation of the present subject matter, on receiving a print job, the corresponding documents may be printed and stored in one of the protected trays, based on a tray selection logic. The tray selection logic may be based on at least one of a fill level in each of the protected trays, user information associated with each of the protected trays, and a default load balancing criterion. A fill level may indicate occupied tray space in a protected tray, which may aid in selection of an appropriate protected tray. User information may include a user ID of a user requesting a print job. Further, a default load balancing criterion may be a logic to evenly balance out load among the protected trays.

Each of the protected trays may store the printed confidential documents for multiple print jobs to efficiently use available space for storing printed confidential documents and to cater to multiple users concurrently without having to increase number of protected trays proportionally to the number of users. To ensure confidentiality, the printed confidential documents of a print job may be provided on successful authentication of a user. On being authenticated, the printed confidential documents of a print job corresponding the authenticated user may be ejected from the corresponding protected tray to the output tray for collection by the user. For the purposes of explanation, a print job corresponding to the authenticated user may be referred to as authenticated print job.

In certain cases, to provide the transfer of the printed confidential documents of the authenticated print job to the output tray, printed confidential documents of one or more yet-to-be-authenticated print jobs may be transferred to another protected tray. A yet-to-be-authenticated print job may be understood as a print job for which printed confidential documents are yet to be provided to the output tray from the protected trays. Subsequently, the printed confidential documents of the authenticated print job may be transferred to the output tray.

Owing to coupling of the protected trays and provision of inter-tray transfer of the printed confidential documents, the protected trays of the present subject matter may conceptually represent infinite protected trays to securely store and provide printed confidential documents to multiple users. Moreover, since the printed confidential documents of a print job are processed and stored in a protected tray, the printed confidential documents may be readily provided to the user, thereby enhancing user experience while protecting confidentiality of the printed documents.

The following detailed description refers to the accompanying drawings. Wherever possible, the same reference numbers are used in the drawings and the following description to refer to the same or similar parts. While several examples are described in the description, modifications, adaptations, and other implementations are possible. Accordingly, the following detailed description does not limit the disclosed examples. Instead, the proper scope of the disclosed examples may be defined by the appended claims.

Figure 1:
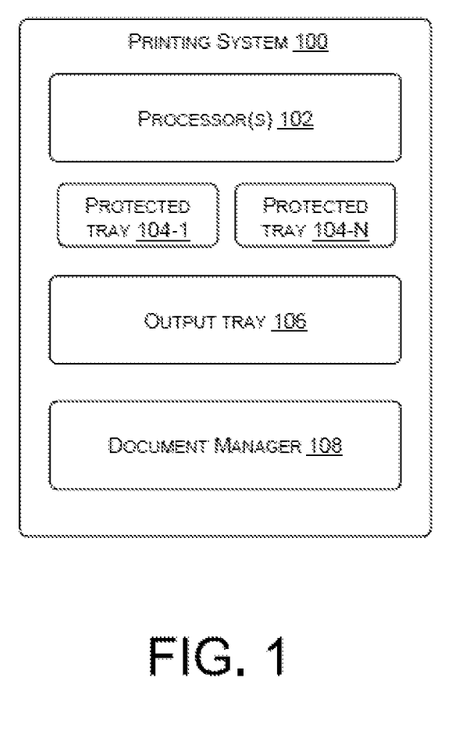
FIG. 1 illustrates a block diagram of a printing system, according to an example implementation of the present subject matter.

FIG. 1 illustrates a block diagram of a printing system 100, according to an example implementation of the present subject matter. The printing system 100 may be, for example, a printer, a copier, a facsimile machine, a special purpose computer with printing capabilities, a server with an associated printing unit, and/or any other type of computing device. The printing system 100 provides for printing of confidential documents for multiple users connected in a network environment.

The printing system 100 includes processor(s) 102. The processor(s) 102 may be implemented as microprocessors, microcomputers, microcontrollers, digital signal processors, central processing units, state machines, logic circuitries, and/or any devices that manipulate signals based on operational instructions. Among other capabilities, the processor(s) 102 may fetch and execute computer-readable instructions stored in a memory coupled to the processor(s) 102 of the printing system 100. The functions of the various elements shown in FIG. 1, including any functional blocks labeled as "processor(s)", may be provided through the use of dedicated hardware as well as hardware capable of executing the computer-readable instructions.

In an example implementation, the printing system 100 also includes at least two protected trays 104-1 and 104-N to store the printed confidential documents from multiple users. The protected trays 104-1 and 104-N may be collectively referred to as protected tray(s) 104. Each of the protected trays 104 may store the printed confidential documents from multiple users. Further, the protected trays 104 are coupled to each other to enable transfer of the printed confidential documents between the protected trays 104. In an example, the protected trays 104 may be electronically lockable to prevent unauthorized access to the stored documents. Additionally, at least one of the protected trays 104 is coupled to an output tray 106 for providing the printed confidential documents for collection by a user.

The printed confidential documents in the protected trays 104 is managed by a document manager 108 coupled to the processor(s) 102. In an example implementation, on receiving an authentication input, the printed confidential documents may be transferred from one of the protected trays 104 to the output tray 106. In operation, on receiving the authentication input for a print job, a protected tray 104, from among the protected trays 104, storing the printed confidential documents of an authenticated print job may be identified. Further, the printed confidential documents from the identified protected tray, say, protected tray 104-1, may be transferred to the output tray 106 for collection.

In case printed confidential documents of other print jobs are stacked above or below the printed confidential documents of the authenticated print job, such printed confidential documents may be transferred from the identified protected tray 104-1 to other protected tray 104-N to provide for transfer of the printed confidential documents of the authenticated print job to the output tray 106. Thus, the coupled protected trays 104 function as infinite number of protected trays to store printed confidential documents from multiple users. Further, a user may collect the printed confidential documents from the output tray without compromising on confidentiality or user experience.

Figure 2:
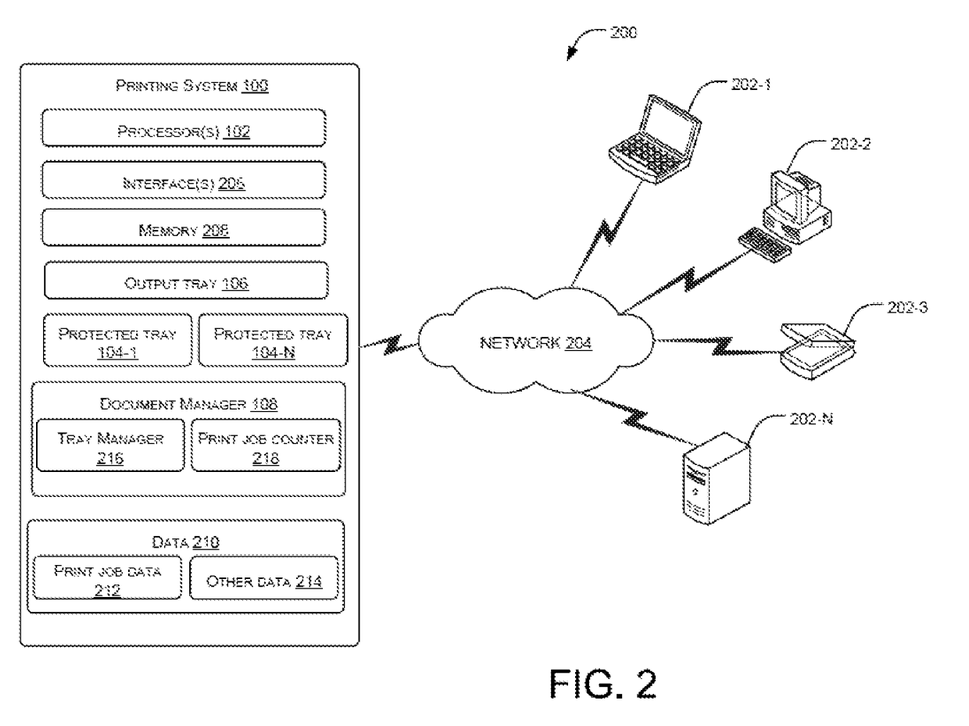
FIG. 2 illustrates a network environment including the printing system, according to an example implementation of the present subject matter.

FIG. 2 illustrates a network environment 200 including the printing system 100, according to an example implementation of the present subject matter. The printing system 100 may be coupled to multiple user devices 202-1, 202-2, 202-3, . . . 202-N, over a network 204. The user devices 202-1, 202-2, 202-3, . . . 202-N may be collectively referred to as user device(s) 202. The user devices 202 may be implemented as desktop computers, multiprocessor systems, personal digital assistants (PDAs), laptops, network computers, scanners cloud servers, minicomputers, mainframe computers, hand-held devices, such as tablets, and the like.

Further, the network 204 may be a wireless network, a wired network, or a combination thereof. The network 204 can also be an individual network or a collection of many such individual networks, interconnected with each other and functioning as a single large network, e.g., the Internet or an intranet. The network 204 can be one of the different types of networks, such as intranet, local area network (LAN), wide area network (WAN), and the internet. The network 204 may either be a dedicated network, a virtual network, or a shared network, which represents an association of the different types of networks that use a variety of protocols, for example, Hypertext Transfer Protocol (HTTP), and Transmission Control Protocol/Internet Protocol (TCP/IP), to communicate with each other. An example of a network 204 may include Fiber Channel Protocol (FCP) on Fiber Channel media. In an example, the network 204 may include a Global System for Mobile Communication (GSM) network, a Universal Mobile Telecommunications System (UMTS) network, or any other communication network that use any of the commonly used protocols, for example, Hypertext Transfer Protocol (HTTP), and Transmission Control Protocol/Internet Protocol (TCP/IP).

The printing system 100, amongst other things, includes the processor(s) 102, interface(s) 206, memory 208, the output tray 106, the protected trays 104, the document manager 108, and data 210. The protected trays 104 are coupled to each other and at least one protected tray 104 is coupled to the output tray 106. The coupling of the protected trays 104 to each other and the coupling of the protected tray to the output tray 106 is described later with reference to description of FIG. 3.

The printing system 100 can be coupled to the user devices 202 over the network 204. In an example, the printing system 100 can be coupled to the network 204 through the interface(s) 206. The interfaces 206 may include a variety of commercially available interfaces, for example, interfaces for peripheral device(s), such as data input output devices, referred to as I/O devices, storage devices, network devices, and intermediate power devices. The interfaces 206 may facilitate multiple communications within a wide variety of networks and protocol types, including wired networks, and wireless networks.

The memory 208 may include any non-transitory computer-readable storage medium including, for example, volatile memory (e.g., RAM), and/or non-volatile memory (e.g., EPROM, flash memory, NVRAM, memristor, etc.).

The document manager 108, amongst other things, include routines, programs, objects, components, and data structures, which perform particular tasks or use particular abstract data type. The document manager 108 may also be used as, signal processor(s), state machine(s), logic circuitries, and/or any other device or component that manipulates signals based on operational instructions. Further, the document manager 108 may be used by hardware, by computer-readable instructions executed by a processing unit, or by a combination thereof.

Further, the data 210 may include print job data 212 and other data 214. The other data 214 may include data generated and saved by the document manager 108 for providing various functionalities to the printing system 100.

As explained above, a user may provide print jobs through the user devices 202 over the network 204 to the printing system 104. In an example, a user may indicate that a print job relates to printing of confidential documents. While non-confidential print jobs may be processed by the printing system 100 and directly outputted to the output tray 106, confidential print jobs may be stored in the protected trays 104. The following description details the process of printing and providing printed documents pertaining to confidential print jobs.

On receiving the print job, the document manager 108 may associate an authentication identifier with the print job. The authentication identifier may be, for instance, a biometric identifier, a pin, a password, or a smart card code. The authentication identifier may be dynamically associated by the document manager 108 or the user may be requested to provide the authentication identifier, such as a password. The authentication identifier corresponding to each print job may be stored in the print job data 212. The print job data 212 may also include user information, such user ID corresponding to each print job.

Further, in an example, on receiving the print job, the document manager 108 may select a protected tray 104 from among the protected trays 104 to store the printed confidential documents of the print job. The protected tray 104 may be selected using a tray selection logic, which may be based on at least one of a default load balancing criterion, user information associated with each of the print jobs, and a fill level of the protected trays 104.

The default load balancing criterion may provide for selection of a protected tray 104 so as to optimally balance load among the protected trays 104. For instance, the default load balancing criterion may be to alternately assign the print jobs to the protected trays 104. In another example, the default load balancing criterion may be to assign print jobs based on a size of the print job. Further, the tray selection logic may also be based on the user information associated with the print jobs. For example, the print jobs from the same user may be stored in the same protected tray 104.

In yet another example, the tray selection logic may be based on a fill level of the protected trays 104. The fill level of the protected trays may be monitored by a tray manager 216 of the document manager 108. Thus, in case one of the protected trays 104 is relatively empty as compared to the other protected tray 104, new confidential print jobs may be stored in the other protected trays 104. Thus, based on the tray selection logic, the protected tray 104 for storing the printed confidential documents may be selected.

In an example, the print job may be instantly processed and the printed confidential documents may be stored in the selected protected tray 104. However, in other cases, the processing of the print job may be initiated on receiving a trigger from the user.

Further, the document manager 108 may also maintain information pertaining to each print job in each of the protected trays 104 in print job data 212. Print job data 212, in addition to storing user information pertaining to each print job, may also include number of sheets of each print job and order of stacking of the various print jobs in each of the protected trays 104. The order of stacking of the print jobs in the protected trays 104 aids in determining the paper path for ejecting the printed confidential documents for a given print job, as will be explained in detail later.

Print jobs from multiple users may be stored in the protected trays 104. In one example, once the confidential documents are printed, a notification may be provided to the corresponding user to collect the printed confidential documents. Accordingly, the printed confidential documents pertaining to multiple print jobs from various users remain securely stored in the same protected tray 104 and these documents may be collected by the user as per their convenience.

To maintain confidentiality of the printed confidential documents in the protected trays 104, the user may be authenticated prior to providing the protected confidential documents for collection. The authentication of the user may be based on the authentication identifier associated with the print job. The user may be requested to provide an authentication input, which may be matched against the associated authentication identifier to provide the printed confidential documents for collection.

On successful authentication, the document manager 108 may identify the protected tray 104 storing the printed confidential documents for the authenticated print job. The protected tray 104 may be identified by the document manager 108 using the print job data 212. Further, the document manager 108 may ascertain whether the printed confidential documents can be directly ejected to the output tray 106. In an example, to ascertain whether the authenticated print job can be directly pushed to the output tray 106, an order of stacking of the authenticated print job may be determined. For instance, the protected trays 104 may eject the printed confidential document stacked at the top, at the bottom or from both, the top and the bottom. Therefore, in case the authenticated print job is stacked in between other print jobs, it may not be directly ejected to the output tray 106.

For the purposes of explanation, the print jobs in a protected tray 104 other than the authenticated print job, may be referred to as yet-to-be-authenticated print jobs. The yet-to-be-authenticated print jobs are the print jobs having printed confidential documents stored in the protected tray 104 but are yet to be authenticated for collection by the corresponding users. Further for ease of understanding, transfer of the printed confidential documents is explained with reference to a case where top most sheets are transferred first. It will be understood that similar principles may be extended to cases where bottom most sheets are transferred first or where the sheets can be transferred from top as well as the bottom. Accordingly, the printing system 100 may operate in a first in first out mode, a last in first out mode, a first in last out mode, a last in last out mode, or a combination thereof.

For example, in case it is ascertained that the printed confidential documents of the authenticated print job cannot be directly provided to the output tray 106, the document manager 108 may determine the print jobs stacked above the authenticated print job using the print job data 212. Further, a print job counter 218 of the document manager 108 may determine a cumulative number of sheets stacked above the authenticated print job. The print job counter 218 may accordingly count and transfer the determined number of sheets to other protected tray 104. Subsequently, the number of sheets corresponding to the authenticated print job may be ejected to the output tray 106. Further, the document manager 108 may accordingly update the print job data 212 to reflect real-time information pertaining to the print jobs in each of the protected trays 104.

Further, in cases where it is ascertained that the authenticated print job may be directly transferred to the output tray 106, the print job counter 218 may count and provide the number of sheets corresponding to the authenticated print job from the protected tray 104 to the output tray 106.

The transfer of the printed confidential documents to the output tray 106 may be understood with the help of following examples.

In an example, consider a user-1 providing a print job-1, which may be stored in a protected tray, say, protected tray 104-1. A user-2 may also provide a print job, say print job-2, which may be stored in another protected tray, say, the protected tray 104-N. Another user 3 may provide a print job-3, which may be stored below the print job-1 in the protected tray 104-1. In this example, the three users may be provided a notification to collect the printed confidential documents. The user-1 may be the first to collect the documents. As the print job-1 is stacked at the top of the protected tray 104-1, the number of sheets corresponding to the print job-1 may be counted and transferred from the protected tray 104-1 to the output tray 106. Thus, the printed confidential documents for the authenticated print job are directly transferred to the output tray 106.

In the example above, consider that user-3 approaches the printing system 100 before user-1 to collect the printed confidential documents. In present case, on successful authentication of user-3, the document manager may determine that print job-3 is stored in the protected tray 104-1. Further, it may be determined that print job-3 cannot be directly transferred to the output tray 106. Therefore, the print job counter 218 counts the number of sheets corresponding to print job-1 and transfer the sheets to the other protected tray 104-N. Upon transfer of print job-1 to the protected tray 104-N, print job-3 comes at the top of the stack and is transferred to the output tray 106. As mentioned before, the document manager 108 updates the print job data 212, which would now indicate that the print job-1 is stored in the protected tray 104-N and that the protected tray 104-1 is empty. Accordingly, the protected trays 104 may serve multiple users concurrently and at the same time may also maintain the confidentiality of the printed documents.

Further, in other example implementations, where one protected tray 104 is coupled to the output tray 106 and the printed confidential documents of an authenticated print job are stored in another protected tray 104 uncoupled to the output tray 106, the printed confidential documents of the authenticated print job may be transferred to the protected tray 104 coupled to the output tray 106 to provide the printed confidential documents for collection.

In one example implementation, to ensure that sufficient space is available for new print jobs, the tray manager 216 may provide for disposing of one or more stored print jobs in the protected trays 104. For instance, the tray manager 106 may monitor a fill level of the protected trays 104. The fill level may be indicative of occupied or available space in each of the protected trays 104. Based on the fill level, the stored print jobs from at least one of the protected trays 104 may be disposed. For instance, a stored print job, which remains uncollected for a threshold amount of time in the protected trays may be provided to a shredder (not shown in the figures) associated with the printing system 100 to shred the printed confidential documents. In another example, the printed confidential documents of the stored print job may be reprinted to obscure the contents and the reprinted document may be ejected to the output tray 106. In yet another example, a reminder notification may be provided to the corresponding user or to an administrator to collect the printed confidential document.

In other examples, the tray manager 216 may also periodically send out reminder notifications, irrespective of the fill level, to the users corresponding to the uncollected print jobs or to the administrator. Further, in an example implementation, to optimally balance load among the two protected trays 104, the printed confidential documents may be transferred from a nearly full protected tray to another protected tray to ensure the protected trays continue to serve the users. Thus, the protected trays 104 and the print jobs stored in the protected trays 104 may be monitored to maintain space for new print jobs.

Figure 3:
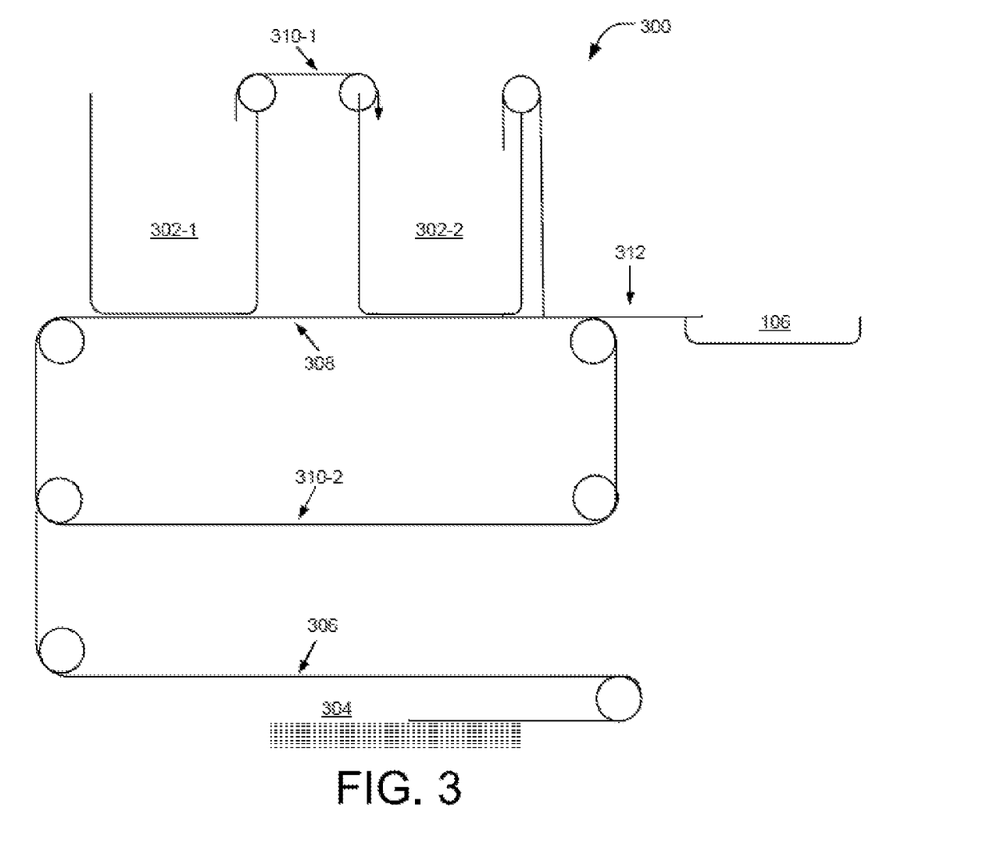
FIG. 3 illustrates a schematic diagram illustrating the printing system, according to an example implementation of the present subject matter.

FIG. 3 illustrates schematics of a printing unit 300 of the print system 100, according to an example implementation of the present subject matter. The printing unit 300 may a unit including hardware components that provide for transfer of the documents among various trays of the printing system 100. As illustrated the printing unit 300 includes two protected trays, viz., a first protected tray 302-1 and a second protected tray 302-2, the output tray 106, and various paper paths. The first protected tray 302-1 and the second protected tray 302-2 may be collectively referred to as protected tray(s) 302. Further, the paper paths may be provided, for instance, using a spool mechanism. For the sake of brevity, two protected trays 104 have been illustrated; however it will be understood that the printing system 100 may have more than two protected trays in other implementations. Further, FIG. 3 illustrates an example where the printed confidential documents stacked at the top are transferred to other trays. However, the described principles may be extended to a case where the printed confidential documents from the bottom are transferred to the other trays.

According to example, on providing a print job, sheets from a paper tray 304 may be fetched and provided for printing through a paper print path 306. Thus, the paper print path 306 provides for coupling of the paper tray 304 to a printer (not shown in the figures). On printing of the confidential documents, based on the selected protected tray, the printed confidential documents may be stored in any one of the protected trays 302 through a job storage paper path 308. The job storage paper path 308 couples the printer to the protected trays 302 to provide for storing of the printed confidential documents.

Further, the protected trays 302 may be coupled to each other via protected paper paths 310-1 and 310-2 for transfer of documents from the first protected tray 302-1 to the second protected tray 302-2. The protected paper path 310-1 provides for transfer of the printed confidential documents from the first protected tray 302-1 to the second protected tray 302-2. Likewise, the protected paper path 310-2 provides for transfer of the printed confidential documents from the second protected tray 302-2 to the first protected tray 302-1. The two protected trays 302 may also be coupled to the output tray 106 through an output paper path 312. The output paper path 312 provides the ejected printed confidential documents from the protected trays 302 to the output tray 106.

Figure 4:
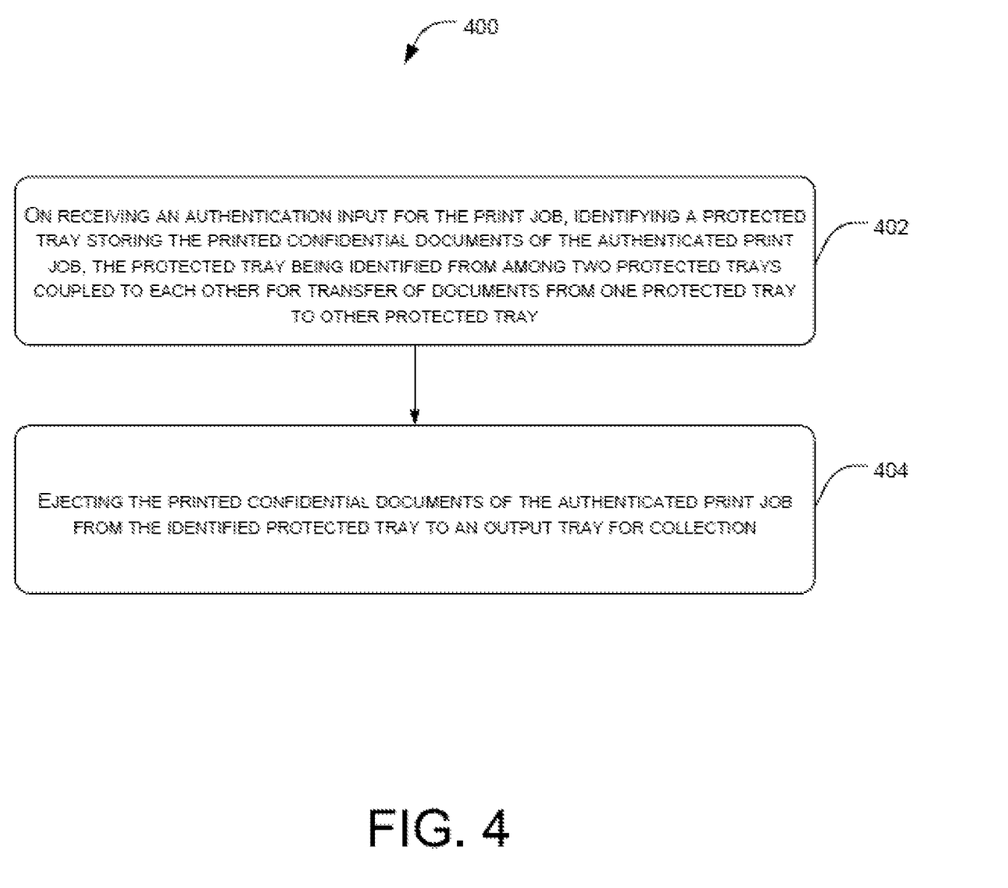
FIG. 4 illustrates a method for providing printed confidential documents, according to an example implementation of the present subject matter.
Figure 5:
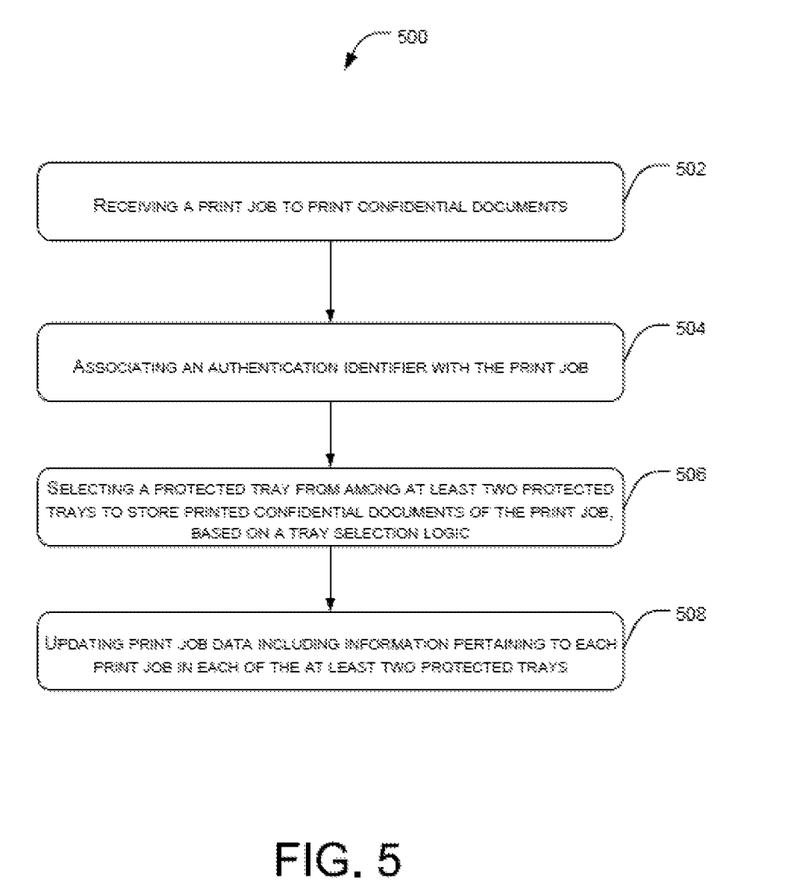
FIG. 5 illustrates a method for printing confidential documents, according to an example implementation of the present subject matter
Figure 6:
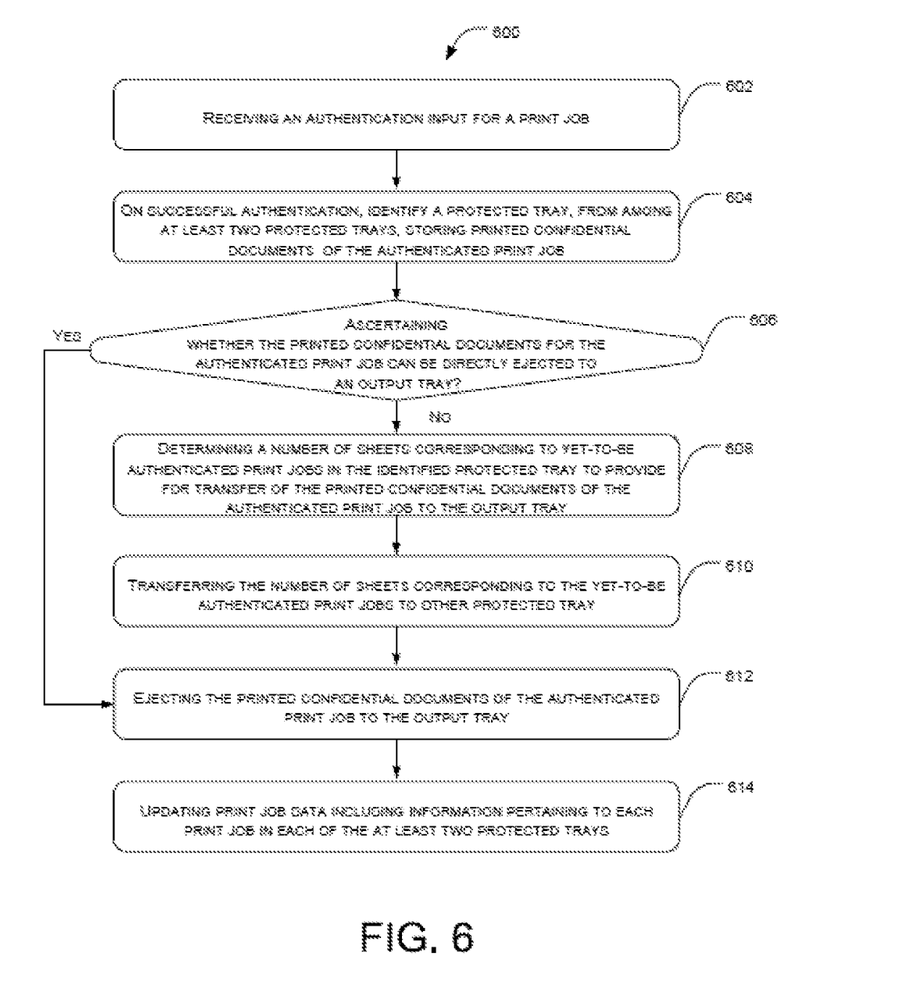
FIG. 6 illustrates a method for providing printed confidential documents, according to an example implementation of the present subject matter

Methods 400, 500, and 600 are described in FIG. 4, FIG. 5, and FIG. 6, respectively, for printing and providing confidential documents, according to an example implementation of the present subject matter. While FIG. 4 illustrates an overview of the method 400 for providing printed confidential documents, FIG. 6 illustrates a detailed method 600 for providing the printed confidential documents. FIG. 5 illustrates a method 500 for printing confidential documents, which may be provided using the methods 400 and 600.

The order in which the methods 400, 500, and 600 are described is not intended to be construed as a limitation, and any number of the described method blocks can be combined in any appropriate order to execute the methods 400, 500, and 600 or an alternative method. Additionally, individual blocks may be deleted from the methods 500 and 600 without departing from the spirit and scope of the subject matter described herein.

The methods 400, 500, and 600 can be performed by programmed computing devices, for example, based on instructions retrieved from non-transitory computer readable media. The computer readable media can include machine-executable or computer-executable instructions to perform all or portions of the described method. The computer readable media may be, for example, digital memories, magnetic storage media, such as a magnetic disks and magnetic tapes, hard drives, or optically readable data storage media.

The methods 400, 500, and 600 may be performed by a computing system, such as the printing system 100. For the sake of brevity of description of FIG. 4, FIG. 5, and FIG. 6, the components of the printing system 100 performing the various steps of the methods 400, 500, and 600 are not described in detail with reference to FIG. 4, FIG. 5, and FIG. 6. Such details are provided in the description provided with reference to FIG. 1, FIG. 2, FIG. 3, and FIG. 7.

Referring to FIG. 4, at block 402, on receiving an authentication input for a print job, a protected tray storing printed confidential documents of the authenticated print job may be identified. The protected tray identified may be from amongst two protected trays coupled to each other for transfer of the printed confidential documents from one protected tray to the other protected tray.

At block 404, the printed confidential documents of the authenticated print job may be ejected from the identified protected tray to an output tray for collection by the user.

Referring to FIG. 5, the method 500 describes a method for printing confidential documents, according to an example implementation of the present subject matter.

At block 502, a print job to print confidential documents may be received.

At block 504, an authentication identifier may be associated with the print job received. The authentication identifier may be, for instance, a pin, a password, or a biometric input. The authentication identifier may be used to authenticate a user collecting the printed confidential documents.

At block 506, a protected tray from amongst at least two protected trays may be selected, to store the printed confidential documents. The protected tray selection may be based on a tray selection logic. The tray selection logic may be based on the at least one of a fill level in each of the protected trays, user information associated with each of the protected trays, and a default load balancing criterion.

At block 508, print job data may be updated to reflect real-time information pertaining to each print job in each of the protected trays. The updated print job data may be used subsequently for selecting a protected tray for storing the printed confidential documents for new print jobs as explained above or for providing the printed confidential documents to a user as will be explained with reference to method 600.

Referring to FIG. 6, the method 600 provides a method for providing the printed confidential documents, according to an example implementation of the present subject matter.

At block 602, an authentication input for a print job may be received. The authentication input may be, for instance, a pin, a password, or a biometric input. The authentication input may be matched against the authentication identifier previously associated with the print job at block 504.

At block 604, on successful authentication, a protected tray for storing the printed confidential documents of the authenticated print job may be identified from amongst at least two protected trays At block 606, it may be ascertained whether the printed confidential documents for the authenticated print job may be directly ejected to an output tray.

If at block 606 it is ascertained that the printed confidential documents cannot be directly ejected to the output tray, the method 600 may branch to ('No' path) block 608.

At block 608, a number of sheets corresponding to one or more yet-to-be-authenticated print jobs in the identified protected tray are determined to provide for transfer of the printed confidential documents of the authenticated print job to the output tray.

Further, at block 610, the number of sheets corresponding to the yet-to-be authenticated print jobs are transferred from the identified protected tray to another protected tray.

At block 612, the printed confidential documents of the authenticated print job are ejected to the output tray.

Referring back to block 606, in case it is determined that the printed confidential documents may be directly transferred to the output tray, the method 600 proceeds to ('Yes' path) block 612, where the printed confidential documents are provided to the output tray.

At block 614, print job data may be updated to reflect real-time information pertaining to each print job in each of the protected trays subsequent to transfer of the protected confidential documents to the output tray, the protected tray, or both.

At block 614, print job data may be updated in the printing system. The print job data pertains to information of print job in each of the protected trays.

Figure 7:
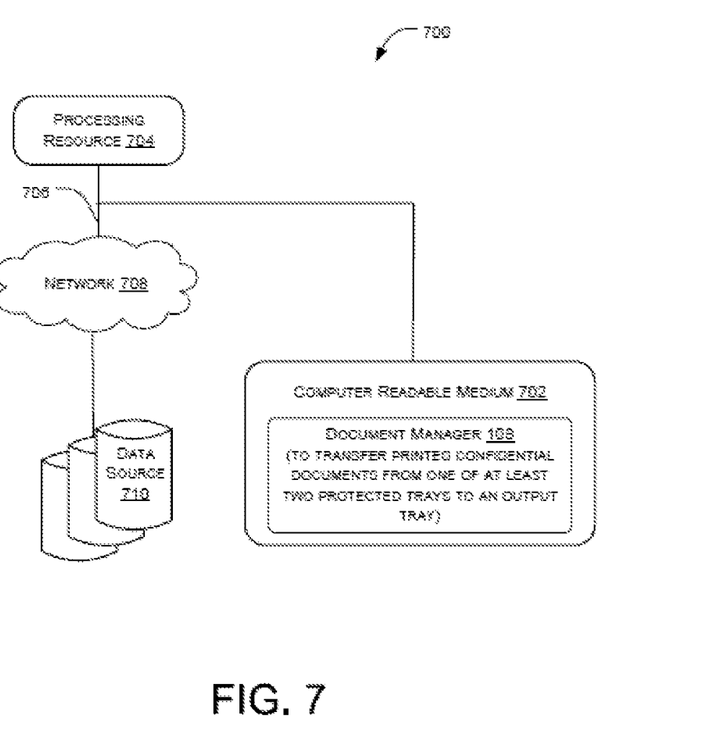
FIG. 7 illustrates a network environment to provide printed confidential documents, according to an example implementation of the present subject matter.

FIG. 7 illustrates an example network environment 700 using a non-transitory computer readable medium 702 for replicating memory volumes, according to an example implementation of the present subject matter. The network environment 700 may be a public networking environment or a private networking environment. In one example, the network environment 700 includes a processing resource 704 communicatively coupled to the non-transitory computer readable medium 702 through a communication link 706.

For example, the processing resource 704 can be a processor of a computing system, such as the printing system 100. The non-transitory computer readable medium 702 can be, for example, an internal memory device or an external memory device. In one example, the communication link 706 may be a direct communication link, such as one formed through a memory read/write interface. In another example, the communication link 706 may be an indirect communication link, such as one formed through a network interface. In such a case, the processing resource 704 can access the non-transitory computer readable medium 702 through a network 708. The network 708 may be a single network or a combination of multiple networks and may use a variety of communication protocols.

The processing resource 704 and the non-transitory computer readable medium 702 may also be communicatively coupled to data sources 710 over the network 708. The data sources 710 can include, for example, databases and computing devices. The data sources 710 may be used by the database administrators and other users to communicate with the processing resource 704.

In one example, the non-transitory computer readable medium 702 includes a set of computer readable instructions, such as the document manager 108. The set of computer readable instructions, referred to as instructions hereinafter, can be accessed by the processing resource 704 through the communication link 706 and subsequently executed to perform acts for network service insertion.

For discussion purposes, the execution of the instructions by the processing resource 704 has been described with reference to various components introduced earlier with reference to the description of FIG. 1, FIG. 2, and FIG. 3.

On execution by the processing resource 704, the document manager 108 may, on receiving a print job, select a protected tray 104, from among at least two protected trays 104, to store the printed confidential documents of the print job. The protected tray 104 may be selected using a tray selection logic, which is based on at least one of a fill level in each of the protected trays, user information associated with each of the protected trays, and a default load balancing criterion.

Further, to provide the printed confidential documents of a print job, a user may be authenticated. On authentication, the document manager 108 may identify a protected tray 104 storing printed confidential documents of an authenticated print job. The protected tray 104 may be identified using print job data 212, which includes information pertaining to each print job in each of the protected trays 104. Further, the printed confidential documents from the identified protected tray 104 may be provided to the output tray 106 for collection by the user.

In an example, the document manager 108, prior to transferring the printed confidential documents from the identified protected tray to the output tray 106, may convey printed confidential documents pertaining to one or more yet-to-be authenticated print job to another protected tray 104. For instance, in cases where the printed confidential documents of the authenticated print job cannot be directly ejected to the output tray 106, the transfer of the printed confidential document of the yet-to-be authenticated print jobs to another protected tray may be performed to provide for transfer of the printed confidential documents of the print job to the output tray.

Further, a fill level of each of the protected trays 104 may be monitored to dispose the stored printed confidential documents of at least one print job in at least one of the protected trays 104. The stored printed documents may be disposed, for instance, to maintain space for new print jobs.

Thus, the present subject matter provides for printing of confidential documents in a shared printer environment, while maintaining the confidentiality and user experience. Further, a user may collect the printed confidential documents as per his convenience without having to wait near the printing system for print job to finish or to prevent unauthorized users to collect the printed confidential documents.

Although examples for providing printed confidential documents have been described in language specific to structural features and/or methods, it is to be understood that the appended claims are not limited to the specific features or methods described. Rather, the specific features and methods are disclosed as examples for providing the printed confidential documents.

What is claimed is:

1. A printing system comprising:
a processor;
at least two protected trays to store printed confidential documents, the at least two protected trays coupled to each other to enable transfer of the printed confidential documents between the at least two protected trays;
an output tray coupled to at least one of the at least two protected trays to provide the printed confidential documents for collection; and
a document manager coupled to the processor to:
receive an authentication input associated with a first print job,
responsive to receiving the authentication input associated with the first print job, identify a first protected tray of the at least two protected trays which is storing the printed confidential documents of the print job and transfer the printed confidential documents of a second print job from the first protected tray to a second protected tray of the at least two protected trays, wherein the first print job is authenticated according to the authentication input, and the second print job is yet to be authenticated, and
responsively transfer the printed confidential documents associated with the first print job from the first protected tray to the output tray.

2. The printing system as claimed in claim 1 further comprising:
a protected tray paper path for transfer of the printed confidential documents between the at least two protected trays; and
an output paper path for transfer of the printed confidential documents from at least one of the at least two protected trays to the output tray.

3. The printing system as claimed in claim 1, wherein the document manager further comprises a print job counter to:
count a number of sheets of printed confidential documents of the print job; and
transfer the number of sheets of the printed confidential documents of the print job from one of the at least two protected trays to one of:
the output tray; and
the other of the at least two protected trays.

4. The printing system as claimed in claim 1, wherein the document manager further comprises a tray manager to:
monitor a fill level of each of the at least two protected trays; and
dispose stored printed confidential documents pertaining to a print job from at least one of the at least two protected trays based on the fill level.

5. The printing system as claimed in claim 4, wherein the tray manager is to one of:
provide a notification to collect the stored printed confidential documents;
provide the stored printed documents for shredding; and,
provide the stored printed confidential documents for reprinting to obscure contents of the stored printed confidential documents.

6. The printing system of claim 1, therein the output tray is further to provide printed nonconfidential documents for collection, directly after the nonconfidential documents have been printed.

7. A method for providing printed confidential documents of a print job, the method comprising:
on receiving an authentication input for the print job, identifying a protected tray storing the printed confidential documents of an authenticated print job, the protected tray identified from among two protected trays coupled to each other for transfer of documents from one protected tray to an other protected tray;
transferring printed confidential documents of yet-to-be-authenticated printed jobs from the identified protected tray to the other protected tray prior to ejecting the printed confidential documents of the authenticated print job from the identified protected tray to the output tray, wherein the authenticated print job is authenticated in that the authentication input for the print job has been received, and the yet-to-be-authenticated print job is yet to be authenticated in that no authentication input for the print job has not yet been received; and ejecting the printed confidential documents of the authenticated print job from the identified protected tray to an output tray for collection.

8. The method as claimed in claim 7 further comprising updating print job data to reflect real-time information pertaining to print jobs in each of the two protected trays.

9. The method as claimed in claim 7, wherein the transferring comprises determining a number of sheets corresponding to the yet-to-be-authenticated print jobs using print job data, wherein the print job data includes information pertaining to the number of sheets corresponding to each print job in each of the two protected trays and an order of stacking of the print jobs in each of the two protected trays.

10. The method as claimed in claim 7 further comprising, on receiving the print job, selecting a protected tray, from the two protected trays, to store the printed confidential documents of the print job, based on a tray selection logic the tray selection logic being based on at least one of a fill level of each of the two protected trays, user information associated with the print job, and a default load balancing pattern.

11. The method of claim 7, further comprising, outputting printed nonconfidential documents directly onto the output tray for collection.

12. The method of claim 7, wherein the printed confidential documents of the yet-to-be-authenticated print jobs being on the identified protected tray prevent transfer of the printed confidential documents of the authenticated print job from the identified protected tray to the output tray.

13. A non-transitory computer readable medium having a set of computer readable instructions that, when executed, cause a processor to:
    identify, from among at least two coupled protected trays, a protected tray storing printed confidential documents of an authenticated print job, wherein the protected tray is identified using print job data including information pertaining to each print job in each of the at least two coupled protected trays;
    in response to identifying the protected tray, convey the printed confidential documents of yet-to-be-authenticated print jobs from the identified protected tray to another protected tray of the at least two coupled protected trays; and
    after conveying the printed confidential documents of the yet-to-be-authenticated print jobs, transfer the printed confidential documents of the authenticated print job from the identified protected tray to an output tray for collection,
    wherein a print job including confidential documents transitions from being a yet-to-be-authenticated print job to an authenticated print job responsive to an authentication input associated with the print job being received.

14. The non-transitory computer readable medium as claimed in claim 13, wherein the computer readable instructions, when executed, further cause the processor to update the print job data to reflect real-time information pertaining to the print jobs in each of the at least two coupled protected trays.

15. The non-transitory computer readable medium as claimed in claim 13, wherein the computer readable instructions, when executed, further cause the processor to, select, on receiving a print job, a protected tray, from the at least two coupled protected trays, to store the printed confidential documents of the print job, and wherein the protected tray is selected based on a tray selection logic, the tray selection logic being based on at least one of a fill level of each of the at least two coupled protected trays, user information associated with the print job, and a default load balancing criterion.

16. The non-transitory computer readable medium as claimed in claim 13, wherein the computer readable instructions, when executed, further cause the processor to,
    monitor a fill level of each of the at least two coupled protected trays, and
    dispose stored printed confidential documents of at least one print job from at least one of the at least two protected trays based on the monitored fill level.

17. The non-transitory compute readable data storage medium of claim 13, wherein the printed confidential documents of the authenticated print job cannot be transferred from the identified protected tray to the output tray until the printed confidential documents of the yet-to-be-authenticated print jobs are transferred from the identified protected tray.

* * * * *